March 28, 1961

A. T. WUPPERMANN 2,977,478

METHOD OF AND APPARATUS FOR MEASURING
THE THICKNESS OF MATERIALS

Filed Nov. 10, 1954

INVENTOR
AUGUST THEODOR WUPPERMANN
BY
*Young, Emery & Thompson*
ATTYS.

United States Patent Office 2,977,478
Patented Mar. 28, 1961

2,977,478
METHOD OF AND APPARATUS FOR MEASURING THE THICKNESS OF MATERIALS
August Theodor Wuppermann, Leverkusen, Germany, assignor to Exatest Gesellschaft für Messtechnik mit beschränkter Haftung, Leverkusen, Germany, a German corporation
Filed Nov. 10, 1954, Ser. No. 468,102
Claims priority, application Germany Nov. 11, 1953
6 Claims. (Cl. 250—83.6)

The invention relates to a method of and apparatus for measuring the thickness of materials in web form (such as hot rolled sheet metal) without touching them, by means of penetrating electromagnetic radiation, for the purpose of adjusting the rolling mill to correct any departure from the desired thickness.

Methods of measuring thickness by such radiation are already known, which consist in determination of the thickness by measurement of the absorption of the radiation by the material, such measurement being made by the aid of counting tubes, ionisation chambers, scintillation counters or other means for measuring the ionisation passing through the web. X-rays may be employed as the radiation in such measurement, but have the disadvantage that if the material is thick very high potentials must be used. The great expense of this can be avoided by employing gamma rays emitted by radioactive isotopes. But gamma radiation has the disadvantage, as compared with X-rays, that because of its far greater penetration, small differences in absorption due to minute variations of thickness cannot be measured with precision. For this reason X-rays are still usually employed because they allow of more exact measurement of small differences in absorption.

The invention eliminates those disadvantages of measurement by absorption by making use of the secondary radiation from the material to be measured. If the incident radiation is sufficiently penetrating it is scattered by the electrons of the material, for an electron and a quantum of radiation behave like two colliding particles which exert elastic force one upon the other; and the wave length, direction and intensity of this scattered penetrating electromagnetic radiation are determined by the principles of conservation of momentum and energy. This secondary radiation resulting from the Compton effect, the characteristic radiation and the omission of secondary electrons is used for measuring. For penetrating radiation the intensity of the secondary scattered radiation is proportional to the thickness of the material. The part played by the Compton effect is a maximum when the quantum energy of the incident radiation is equivalent to the electron mass.

A further feature of the invention enables the attainment of still greater exactitude; the intensity of the radiation passing through the material to be measured as well as that of the secondary radiation is determined by suitable ionisation measuring means. The great precision of this method rests in the first place on the use made of secondary radiation, and in the second place on the fact that the intensity of the radiation passing through the material under test varies inversely as the intensity of the ionisation produced by secondary radiation for varying thickness of material. So the currents produced in the respective ionisation measuring means vary in opposite senses, and their difference can be taken as a measure of the thickness of the material. Especial advantage can be taken of this by adjusting the difference in these currents to zero for the intended thickness of the band of material, so that very small departures from the intended thickness can be measured in circuits which measure the difference in two currents. This use of secondary radiation extends the range of application of isotopes yielding gamma radiation; and greater precision can be obtained with a smaller expenditure upon the source of radiation. In order that the Compton secondary radiation may be strong it is of advantage if the quantum energy of the gamma radiation is about 0.5 mev., for an electron and a quantum of such radiation have the same mass, and so a maximum exchange will occur between them on collision and there will be maximum secondary radiation. Thus cobalt isotopes, for example, are suitable for the purpose. And the caesium isotopes also give suitable values of mev. Best of all for the purpose are substances which emit positron radiation, since the positrons immediately "re-act" in the presence of the electrons of the material, and disperse quanta of gamma radiation of an energy of about 0.5 mev., a value which yields an optimum exchange of energy for the Compton effect. Specially suitable for the purpose is the positron-radiating isotope of sodium of mass number 22, since it has so long a half life as three years.

The indications of thickness may be ascertained in terms of thickness before an operator exerting manual control on the setting of the rollers of the mill or other machine producing the sheet material.

Also various means being known for automatically adjusting the pressure of the rollers, including optical, electrical, magnetic and electronic regulating means, it is not difficult to use the current which operates the thickness indicator to bring into action also such automatic regulating means.

Examples of measuring apparatus according to the invention are illustrated in the accompanying drawings.

Figure 1:
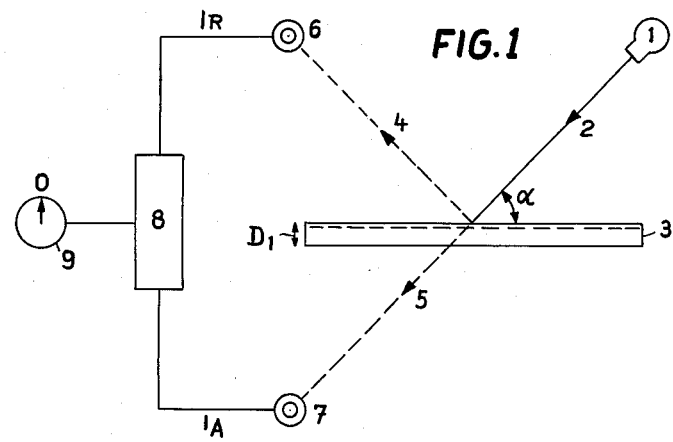
Figure 1 shows diagrammatically how the invention works.

In Figure 1 there is a source of radiation 1 the beam 2 of which is incident at an angle α on the material 3 to be measured. In part it penetrates the material and emerges weakened; in part its energy is scattered in the form of quanta of gamma rays or hard X-rays—the Compton radiation—and of radiation from the atoms of the material excited by the incident rays. The whole of this radiation returned from the material in lieu of passing through it is herein referred to as secondary radiation. It is not, as Figure 1 might suggest, a regularly reflected beam, but is scattered. This secondary radiation 4 called forth by the radiator 1, and the beam 5 which passes through the material lessened by absorption on the way, produce currents $I_R$ and $I_A$ in the secondary radiation counter tube 6 and the absorption counter tube 7 respectively. When the apparatus is adjusted for a desired thickness of material by balancing the bridge 8 there will be zero indication for that thickness on the measuring instrument 9. The bridge-connected counter tube may be considered as a resistance $R_Z$ the value of which is dependent on the energy of radiation and the ionisation resulting from it. When the bridge is balanced there is in the branch ABC an E.M.F.

$$Ug = i_1 R_{Z6} + i_1 R_1$$

and in the branch ADC an E.M.F.

$$Ug = i_2 R_{Z7} + i_2 R_2$$

There will be no current across the bridge when $$R_{Z6} : R_{Z7} :: R_1 R_2$$

If the thickness of a material 3 to be measured exceeds what it ought to be the reflected beam 4 will be more intense, the ionisation in the secondary radiation counter tube 6 will be greater and its resistance $R_{Z6}$ will be less. On the other hand the energy of the transmitted beam 5 diminishes, so the ionisation of the absorption counter tube 7 decreases and the resistance $R_{Z7}$ increases. Thus the balance of the bridge is upset and the current flowing across the bridge is a very exact and sensitive measure of the changes in thickness. If the current taken by the indicating instrument can be neglected the changes in resistance of the counter tubes correspond with the changes in the currents $i_1$ and $i_2$ in the bridge branches ABC and ADC. Since the changes $\Delta i_1$ and $\Delta i_2$ in the currents are in opposite sense the E.M.F. applied to the instrument 9 upon the above assumption will be:

$$U_M = R_2|\Delta i_2| + R_1|\Delta i_1|$$

Figure 2:
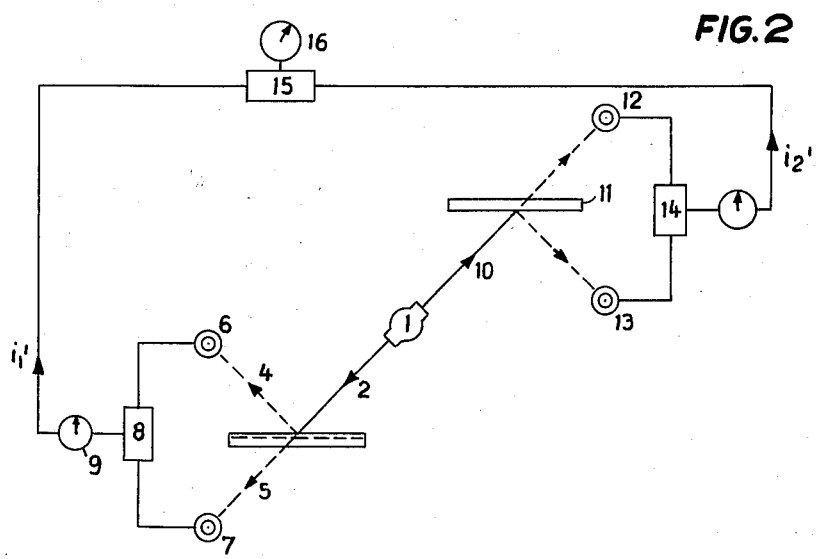
Figure 2 shows a measuring apparatus which utilises a comparison standard.

The example of the invention shown in Figure 2 differs from that above described inasmuch as a second beam 10 issues from the radiator 1 and impinges upon a comparison sheet 11 of the desired thickness. The equilibrium current produced in the bridge 14 by ionisation in the absorption counter tube 12 and the secondary radiation counter tube 13 is compared in the bridge 15 with that in the bridge 8 and shown by the measuring instrument 16.

Figure 3:
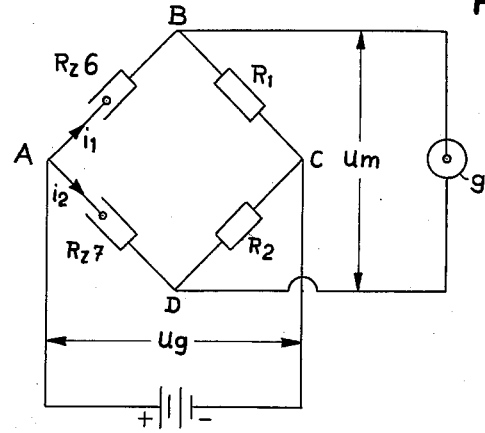
Figure 3 is a diagram of connections for an apparatus working in the manner shown by Figure 1.
Figure 4:
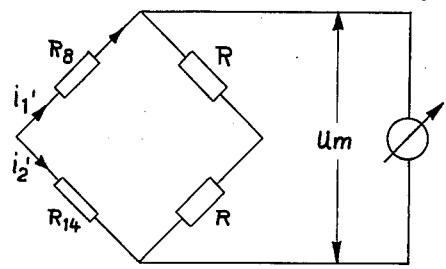
Figure 4 is a diagram of connections of the electrical measuring means of this apparatus.

Figure 4 is a diagram of connections for the scheme of Figure 2. In this diagram $R_8$ represents the complete bridge of Figure 3, and $R_{14}$ is a similar bridge containing the counter tubes 12 and 13 of Figure 2. The combined bridge is completed by resistances R and the indicating instrument 16. Each of the bridges $R_8$ and $R_{14}$ is first adjusted to equilibrium for the desired thickness of material. The combined bridge is then also balanced by the temporary connection of a source of voltage across its horizontal diagonal. Variations in the intensity of radiation from the radiator 1 will not upset the balance; but changes in the thickness of the material being measured will result in a deflection of the instrument 16 to one side or the other.

I claim:

1. An apparatus for measuring the thickness of a band of material such as hot rolled sheet material comprising a source of gamma rays, means for directing an inclined beam of said gamma rays upon the surface of the sheet, a detector on each side of the sheet to receive the radiated and penetrating gamma rays, respectively, one detector being arranged in line as well with the primary beam as the beam penetrating through the sheet, and electrical means connected to and interconnecting the detectors to measure the difference of ionization current or voltage created in said interconnecting means.

2. An apparatus according to claim 1, in which the direction of the gamma rays from the source are between 0° and 90°.

3. Apparatus for measuring the thickness of a band of material such as a hot rolled metal sheet, comprising a source of penetrating gamma rays directed at an angle to the surface of the sheet for directing rays upon one surface of the sheet, a detector on the side of said sheet subject to the rays produced on the surface, a detector on the other side of the sheet, and means for indicating the magnitude of the less intense rays.

4. Apparatus for measuring the thickness of a band of material such as a hot rolled metal sheet out of contact therewith, comprising a source of penetrating gamma rays and means for directing it upon one surface of the sheet at an angle thereto, a detector on the same side of said sheet as the source of gamma rays and in which ionization is produced by the rays from the surface, a second detector on the other side of the sheet in the path of the rays passing through the sheet, and means for measuring the difference between the ionization currents produced in the two detectors.

5. Apparatus for measuring the thickness of a band of material such as a hot rolled metal sheet without contacting the sheet, comprising a radiator comprising an isotope selected from the group consisting of cobalt, cesium and sodium and means for directing its radiation upon the metal sheet, a detector on each side of said sheet so that ionization is produced by radiation from the surface of the sheet in one detector and further by radiation only in the second detector on the opposite side of the sheet, and means for indicating the magnitude of the ionization currents.

6. An apparatus for measuring the thickness of a band-like material, particularly a hot rolled material comprising a detector on each side of the material, means to project gamma rays on one side of the material so that the rays will influence the pair of detectors on opposite sides of the material with the angle of the projected rays being between 0° and 90°, and means to measure the intensity of the rays through the material with the intensity of the reradiated rays.

References Cited in the file of this patent

UNITED STATES PATENTS

| | | |
|---|---|---|
| Re. 22,531 | Hare | Aug. 22, 1944 |
| 2,222,429 | Briebrecher | Nov. 19, 1940 |
| 2,264,725 | Shoupp et al. | Dec. 2, 1941 |
| 2,323,128 | Hare | June 29, 1943 |
| 2,395,482 | Hurley | Feb. 26, 1946 |
| 2,547,545 | Strong | Apr. 3, 1951 |
| 2,675,482 | Brunton | Apr. 13, 1954 |
| 2,903,590 | Somerville | Sept. 8, 1959 |